United States Patent
Wiegel

[19]

[11] Patent Number: 6,131,163
[45] Date of Patent: Oct. 10, 2000

[54] NETWORK GATEWAY MECHANISM HAVING A PROTOCOL STACK PROXY

[75] Inventor: Scott L. Wiegel, San Jose, Calif.

[73] Assignee: Cisco Technology, Inc., San Jose, Calif.

[21] Appl. No.: 09/024,941

[22] Filed: Feb. 17, 1998

[51] Int. Cl.⁷ .................................................. G06F 12/14
[52] U.S. Cl. .................................................... 713/201
[58] Field of Search ................................. 713/201, 280; 709/223, 224, 225; 380/23, 24, 25

[56] References Cited

U.S. PATENT DOCUMENTS

| | | | |
|---|---|---|---|
| 5,204,961 | 4/1993 | Barlow | 395/725 |
| 5,557,748 | 9/1996 | Norris | 395/200.1 |
| 5,606,668 | 2/1997 | Shwed | 395/200.11 |
| 5,623,601 | 4/1997 | Vu | 395/187.01 |
| 5,657,452 | 8/1997 | Kralowetz et al. | 395/200.57 |
| 5,832,228 | 11/1998 | Holden et al. | 395/200.55 |
| 5,835,726 | 11/1998 | Shwed et al. | 395/200.59 |
| 5,884,025 | 3/1999 | Baehr et al. | 395/187.01 |
| 5,898,830 | 4/1999 | Wesinger, Jr. et al. | 395/187.01 |
| 5,909,559 | 6/1999 | So | 395/307 |
| 5,924,116 | 7/1999 | Aggarwal et al. | 711/122 |

*Primary Examiner*—Joseph E. Palys
*Assistant Examiner*—Rita Ziemer
*Attorney, Agent, or Firm*—Hickman Palermo Truong & Becker, LLP; Christopher J. Palermo

[57] ABSTRACT

A system for a network gateway that provides computer data security using a protocol stack proxy is disclosed. The system evaluates data that arrives at a computer system that is executing a network operating system. The system comprises a protocol stack proxy, coupled between a device driver on the computer system that is configured to receive the data from a network and deliver the data according to a first protocol associated with a first network layer, and one or more components of the network operating system that receive packets according to the first protocol. The protocol stack proxy has one or more protocol proxy layers configured to (A) receive the data from the device driver; (B) pass the data to a second network layer that is higher than the first network layer; (C) evaluate the data to determine whether the data satisfies a predetermined criteria; and (D) if the data satisfies the predetermined criteria, to (D1) pass the data to the first network layer, and (D2) transmit the data to the one or more components to the network operating system.

50 Claims, 5 Drawing Sheets

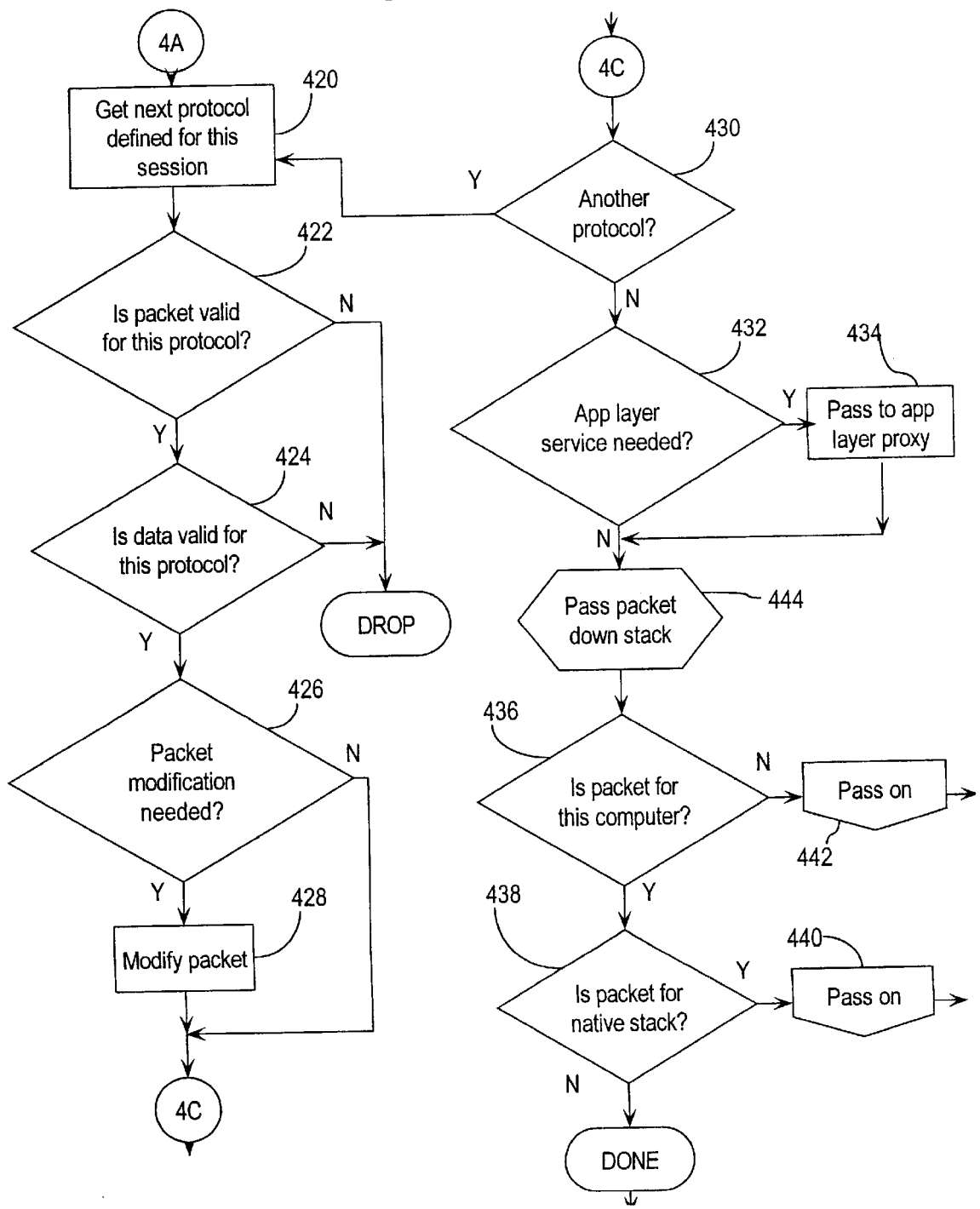

NETWORK GATEWAY MECHANISM HAVING A PROTOCOL STACK PROXY

FIELD OF THE INVENTION

The present invention relates to security in computer networks, and relates in particular to methods, systems and products for evaluating messages passed through a network operating system of a gateway in a computer network.

BACKGROUND OF THE INVENTION

The power of personal computers, terminals, servers and other standalone computing devices is significantly increased by connecting such devices together in a local area network. Using a network, individual users of standalone devices distributed over a large geographic area can access common resources and communicate. Networks themselves can be interconnected or "internetworked" locally or over a large area. Such networks also can be connected to a vast, global network, operating according to standard protocols, known as the Internet. Using the Internet and certain wide area network technologies, local users and devices can connect to, "log on" to, request and use distant devices and computing resources.

This technology also offers users the power to be intentionally or negligently destructive or disruptive to distant systems in many ways. For example, using a technique known as "IP spoofing," a user can change the Internet Protocol (IP) address in a message sent from the user's computer so that messages or transaction requests sent to a remote network appear to be coming from somewhere else. Thus, there is a need for methods, systems and products that can detect and reject such false requests.

As another example, a malicious computer user may attempt a "Ping of Death" attack on another computer system. In this attack, the malicious user repeatedly sends a "ping" command or its equivalent to the remote system, or configures a computer program to automatically send the "ping" command to the remote system repeatedly and continuously. The "ping" command is normally used to poll a remote system to determine whether it is active. If the remote system always attempts to respond to the "ping" command, during a "Ping of Death" attack the system will quickly become overwhelmed so that it is spending all its computing time responding to queries that form a part of the attack. Thus, there is a need for processes, systems and products that can enable a system to test whether requests are accurate, valid, and are coming from an authorized system.

Many other types of unauthorized requests and malicious attacks are known. There is a need to protect networked computer systems, servers and operating systems from malicious or merely unauthorized uses, requests, commands and data transmissions.

These and other undesired uses of computers are ideally trapped and thwarted as early as possible, before they can affect the entire system. It is desirable to detect unauthorized commands, uses or requests arriving in the form of network data as soon as the data arrives at or enters the computer system from a network connection. Thus, there is a need to perform security checks and evaluations at a low level of a computer system, for example, in the operating system.

There is also a need to perform data security checks at a low level of the operating system, for example, as a part of processes that initially receive data from the computer hardware that interfaces the system to a network.

SUMMARY OF THE INVENTION

These needs, and other needs and objects that will become apparent in this document, are fulfilled by the present invention, which comprises, in one aspect, a system for evaluating data that arrives at a computer system that is executing a network operating system. The system comprises a protocol stack proxy coupled between a device driver on the computer system that is configured to receive the data from a network and deliver the data according to a first protocol associated with a first network layer, and one or more components of the network operating system that receive packets according to the first protocol. The protocol stack proxy has one or more protocol proxy layers configured to (A) receive the data from the device driver; (B) pass the data to a second network layer that is higher than the first network layer; (C) evaluate the data to determine whether the data satisfies a predetermined criteria; and (D) if the data satisfies the predetermined criteria, to (D1) pass the data to the first network layer, and (D2) transmit the data to the one or more components to the network operating system.

In another aspect, the invention is a system for evaluating a data packet using a network operating system. The system comprises a protocol layer proxy in a kernel memory of the network operating system, and a sequence of instructions stored in the kernel memory configured to cause a processor under control of the network operating system to execute steps. The steps involve evaluating the data packet in the protocol layer proxy to determine whether the data packet satisfies a predetermined condition; and passing the data packet from the protocol layer proxy to the network operating system only if the data packet satisfies the predetermined condition.

One feature of this aspect is a security policy defining the condition of the data packet to be evaluated and coupled to the protocol layer proxy. Another feature involves an application layer proxy in an application memory of the network operating system; a second security policy defining a second condition of an application protocol of the data packet to be evaluated; and instructions for passing the data packet to the network operating system only if the data packet complies with the second security policy. A related feature is a security policy decision tree in the kernel memory structured as a binary tree and comprising as nodes thereof the security policy and at least a second security policy.

Yet another related feature is at least one existing session identifier stored in the kernel memory; and wherein the instructions cause the processor to execute the step of passing the data packet to the protocol layer proxy only if the data packet matches an existing session identifier. Still another feature is that the system further comprises a network adapter card coupled to the processor; and a security policy decision tree in the kernel memory organized as a binary tree and comprising the security policy and a second security policy associated with the network adapter card.

Another feature of this aspect is that the security policy decision tree comprises a session identifier associated with a network adapter card identifier and with an allowed protocol for the session identifier and the network adapter card. The sequence of instructions comprises instructions configured to cause the processor to execute the step of passing the data packet to the protocol layer proxy only if the data packet matches the session identifier. Still another feature is that the sequence of instructions further comprises instructions configured to cause the processor to execute the step of passing the data packet to the protocol layer proxy only if the data packet matches the allowed protocol.

Another feature involves a second protocol layer proxy associated with the session identifier; and instructions configured to cause the processor to execute the step of passing the data packet to the second protocol layer proxy for evaluation therein. Another feature is a state variable stored in the protocol layer proxy describing a current state of a current network session.

According to another feature, the protocol layer proxy is coupled to a protocol stack of the network operating system and wherein one of the security policies defines an acceptable criteria for data packets directed to the protocol stack. In another feature, the system further comprises a protocol stack in the kernel memory coupled to the protocol layer proxy; and instructions configured to cause the processor to execute the step of communicating the data packet to the protocol stack after evaluation of the data packet.

In another feature, the system has instructions configured to cause the processor to execute the step of identifying the protocol layer proxy as a device driver to the network operating system. In still another feature, the system has instructions configured to cause the processor to execute the step of instructing the network operating system that only the protocol layer proxy is a network device.

In yet another feature, the sequence of instructions further comprises instructions configured to cause the processor to execute the step of instructing a device driver coupled to the network operating system that the protocol layer proxy is a transport layer for the device driver. According to another feature, the protocol stack further comprises a protocol stack layer corresponding to a data protocol evaluated by the protocol layer proxy, and the data packet is communicated to the protocol stack layer after evaluation of the data packet against the data protocol in the protocol layer proxy.

In another feature, the protocol layer proxy executes in a kernel mode of an Executive portion of a windowed operating system. In other features, the security policy defines allowed routing of the data packet or defines allowed data of the data packet.

According to still other features, the protocol layer proxy is configured to evaluate an IP protocol element of the data packet or a TCP protocol element of the data packet. In yet another feature, there is a second protocol layer proxy for evaluating a second protocol different from a first protocol evaluated by the protocol layer proxy, and the protocol layer proxy and the second protocol layer proxy are contained in a protocol proxy stack coupled to the network operating system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A and FIG. 4B are flow diagrams of an embodiment of a process for evaluating data in a networked computer system.

DETAILED DESCRIPTION OF THE PREFERRED EMBODIMENT

A method and apparatus for evaluating information in a network server operating system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
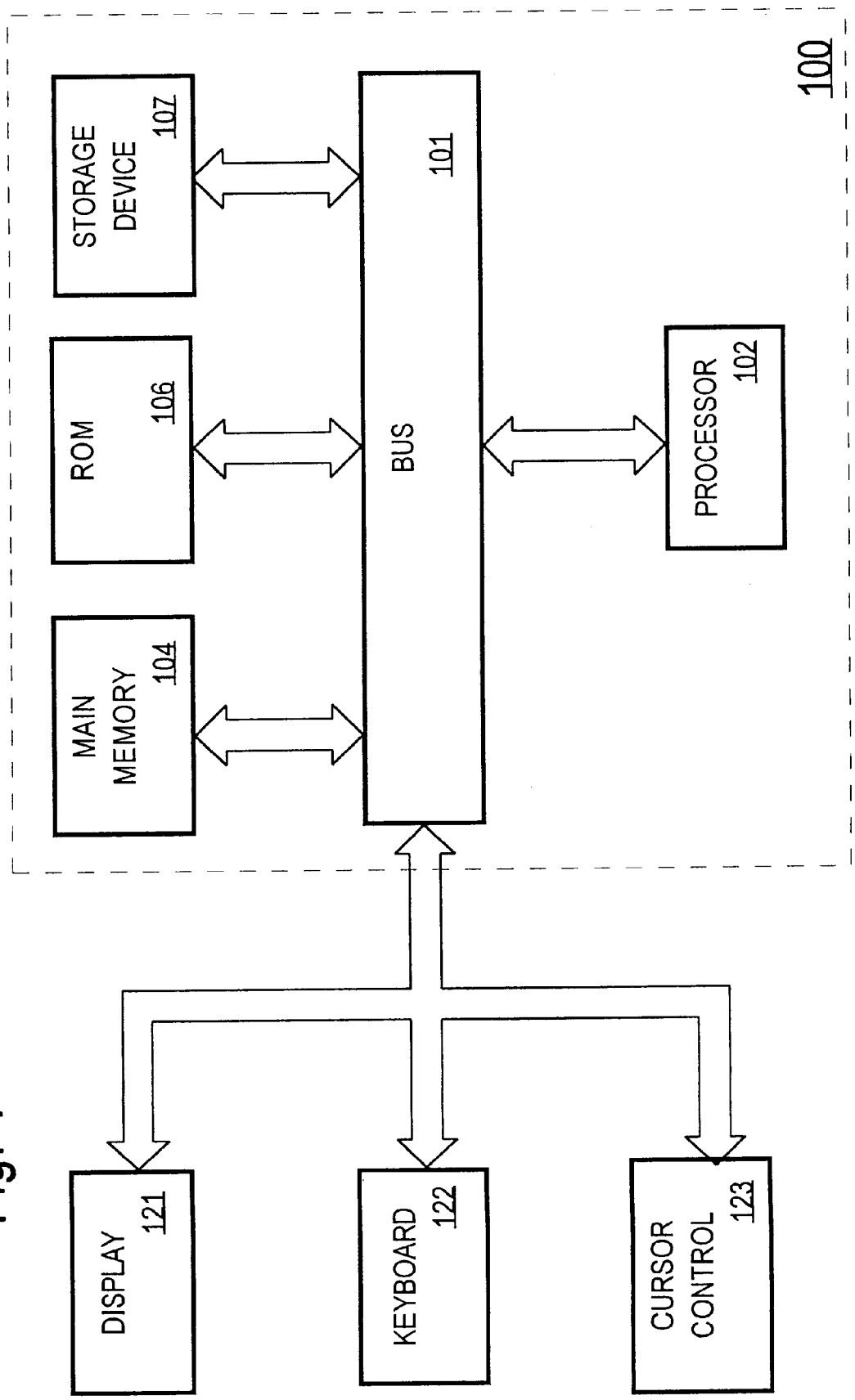
FIG. 1 is a block diagram of a computer system that can be used to operate the present invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to evaluate information in a network operating system. According to one embodiment, evaluation of information in a network operating system is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

NETWORKED OPERATING SYSTEMS

The present invention provides ways to evaluate information in a network operating system. Modern network operating systems are often discussed and compared with reference to an abstract model of operating system components called the OSI reference model, developed in 1978 by the International Standards Organization (or OSI). In the OSI reference model, an operating system has seven layers, as shown in Table 1. By convention, the Physical layer is identified as the lowest layer and is labeled Layer 1.

TABLE 1

OSI Reference Model

| Layer Name | Layer Number |
|---|---|
| Application | 7 |
| Presentation | 6 |
| Session | 5 |
| Transport | 4 |
| Network | 3 |
| Data Link | 2 |
| Physical | 1 |

Generally, each of the components of a network operating system can be compared or "mapped" to one of the layers in the OSI reference model. Each of the layers in the OSI reference model, except the physical layer, generally is associated with a definition of the format of data communicated in that layer, called the "protocol" for the layer. Table 2 lists OSI reference model layers 2 through 7 and exemplary protocols for each layer.

TABLE 2

Protocols for OSI Reference Model Layers

| Layer Name | Layer Number | Exemplary Protocol(s) |
|---|---|---|
| Application | 7 | Server Message Block (SMB); NetWare Control Protocol (NCP) |
| Presentation | 6 | Simplified Network Management Protocol (SNMP) |
| Session | 5 | NetBIOS |
| Transport | 4 | Transmission Control Protocol (TCP); Sequenced Exchange Protocol (SPX) |
| Network | 3 | Internet Protocol (IP); Internet Packet Exchange (IPX) |
| Data Link | 2 | Ethernet frame, Token Ring frame |
| Physical | 1 | (not applicable) |

Figure 2:
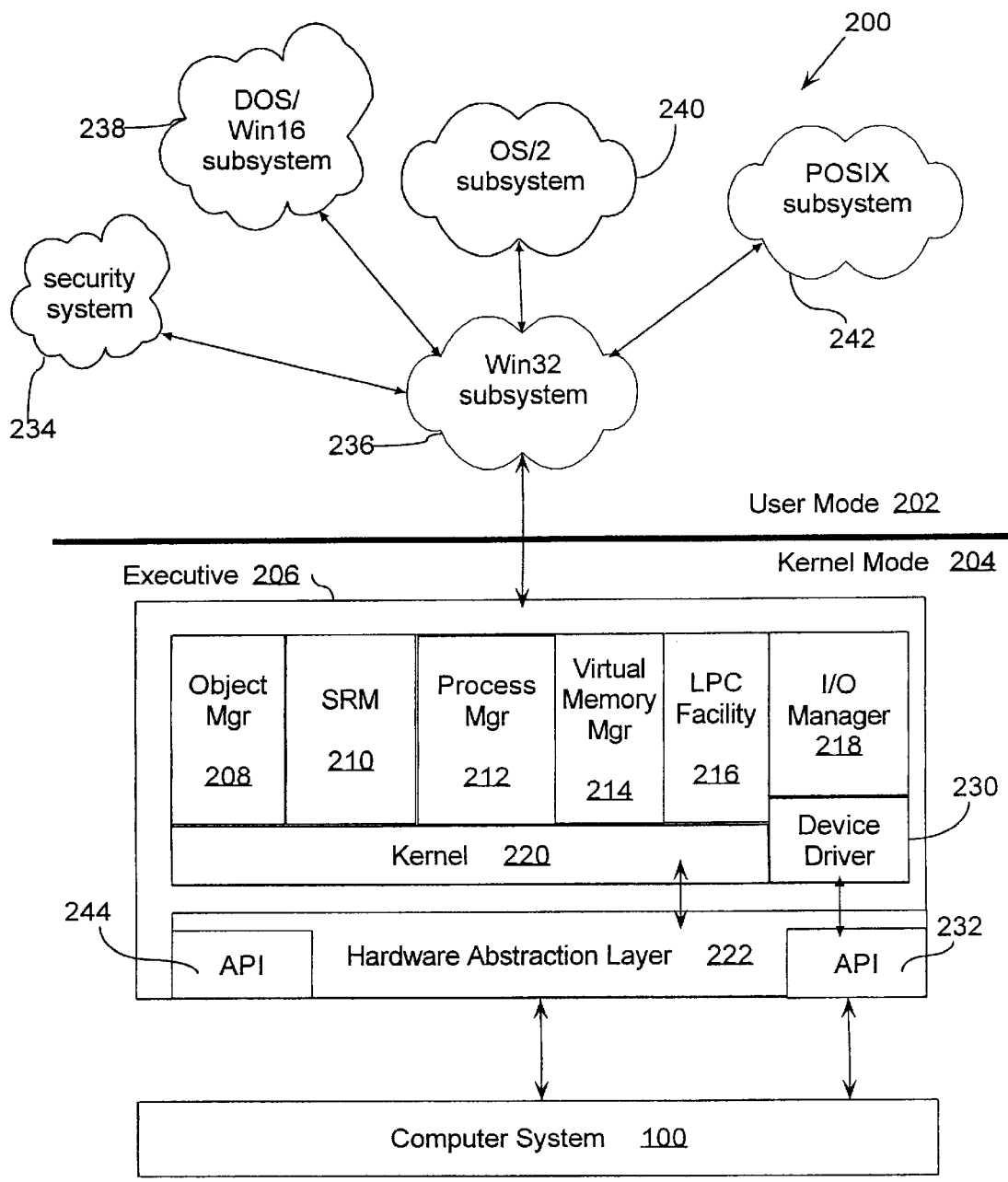
FIG. 2 is a block diagram showing a view of the architecture of the Windows NT operating system.

One modem network operating system with which the invention can be used is Microsoft® Windows NT® Release 4; however, the invention can be used with any network operating system that includes a kernel or its equivalent through which network data flows before being delivered to other operating system layers. The architecture of the Windows NT operating system is shown in FIG. 2 and generally identified by reference numeral 200. Windows NT (also referred to herein as "NT") includes numerous software modules or "components." Components can run in a User Mode 202 or a Kernel Mode 204. When a component runs in the Kernel Mode, it can access all machine instructions for the processor 102 and generally can use all resources of the computer system 100. In NT, such components as the Executive Services (or "executive") 206, the Kernel 220, and the Hardware Abstraction Layer ("HAL") 222 run in Kernel Mode 204.

A Win32 subsystem 236 and other environmental subsystems such as a DOS/Win16 subsystem 238, OS/2 subsystem 240 and POSIX subsystem 242 run in User Mode 202. A security system 234 runs in User Mode 202 and provides user authentication and network authorization functions. The environmental subsystems 234, 236, 238, 240, 242 are User Mode software servers that create and support applications written for another operating system environment, such as DOC, OS/2, and POSIX.

Details of the NT operating system and its components are extensively documented in numerous publications, including K. Siyan, "Windows NT Server 4 Professional Reference" (Indianapolis: New Riders Publishing, 1996), and are not set forth here so as not to obscure the invention.

The HAL 222 interconnects the Kernel 220 to the hardware of computer system 100. The HAL 222 provides an Application Programming Interface (API) (such as API 244) for each principal hardware component of computer system 100 so that the Kernel can be written to communicate with the API rather than the actual machine hardware. In this way, the Kernel and other layers above it are generally hardware-independent. Generally, the Kernel uses the HAL to access computer system 100. A portion of the Kernel, and the I/O Manager 218, accesses hardware of the computer system 100 directly without using the HAL.

The Kernel 220 provides basic operating system functions used by other executive components, such as thread scheduling, hardware exception handling, and multiprocessor synchronization. The Kernel 220 communicates with a processor in computer system 100 through the API 244 to dispatch threads on the next available processor.

The executive 206 has Kernel Mode components that implement processes such as managing software objects (through Object Manager 208), security (using Security Reference Monitor 210), process management (through Process Manager 212), memory management (using Virtual Memory Manager 214), local procedure calls (through Local Procedure Call Facility 216), and input/output management (using I/O Manager 218). The Security Reference Monitor (SRM) 210 enforces user security and application security. Requests by an application or another executive component to access or create an object pass through the SRM. The SRM compares an Access Control Entry (ACE) in an Access Control List (ACL) of the object and tests whether the ACE matches a Security ID of a user or group. If there is no match, access to the object is denied and an exception is raised. Thus, the SRM handles security at the application object level rather than lower levels.

The I/O Manager 218 manages and supervises all input/output functions of the NT operating system. The I/O Manager 218 communicates with a device driver 230 through a device API 232 to hardware devices in the computer system 100. There is one device driver 230 for each class of hardware device. For example, to communicate with disk storage devices, the I/O Manager 218 uses a file system driver. To communicate with network interface cards (NICs), the I/O manager 218 uses an NIC driver.

SECURING THE SYSTEM

Figure 3:
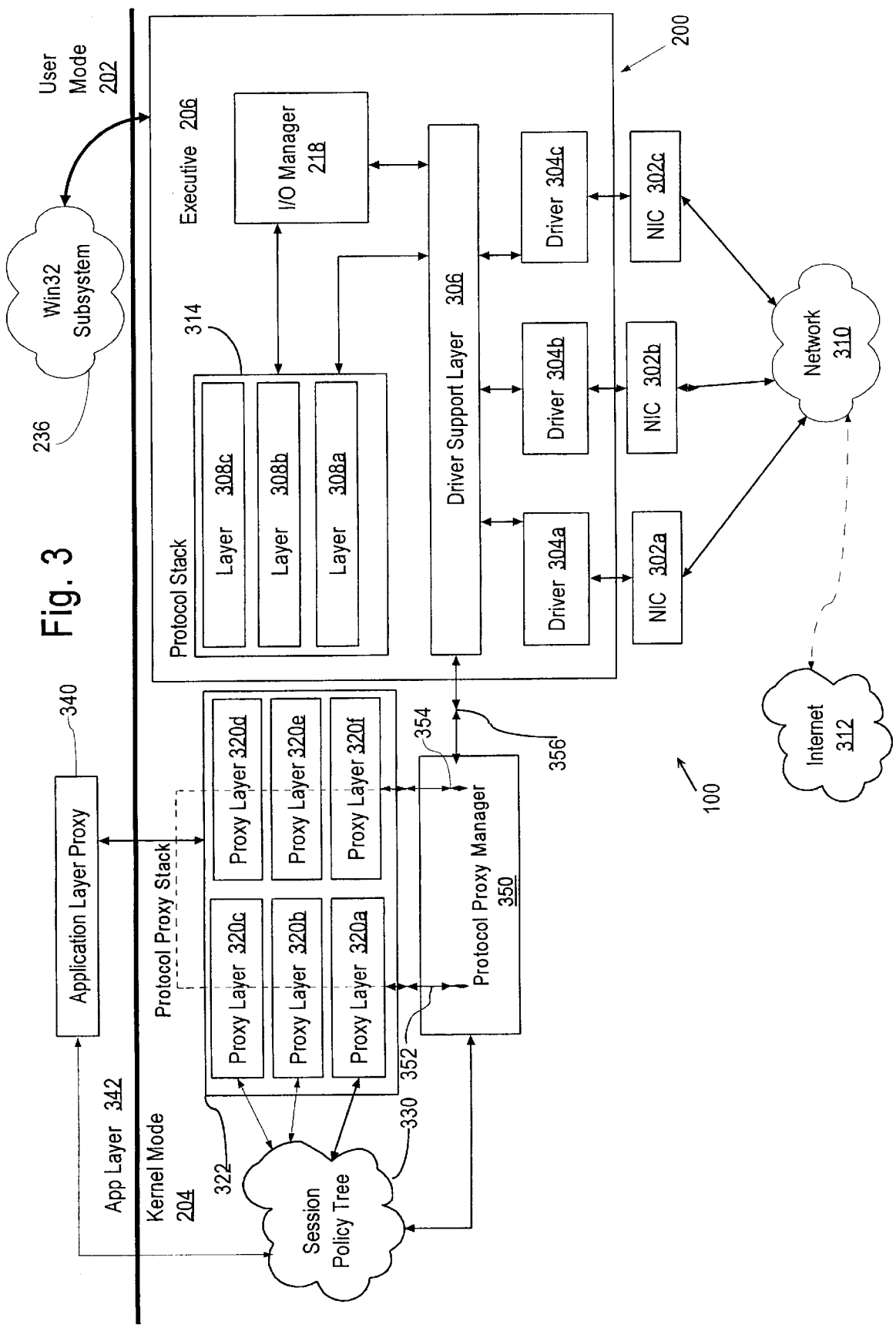
FIG. 3 is a block diagram of an embodiment of an apparatus for evaluating data in a networked computer system.

FIG. 3 is a simplified block diagram of the NT operating system shown as part of a computer system 100 adapted with features of the present invention. The system is adapted to receive and transmit messages or other communications to a local area network 310 that is coupled to a global computer network 312 such as the Internet. The network is coupled to the computer system 100 through one or more Network Interface Cards (NICs) 302a, 302b, 302c. Each of the NICs 302a, 302b, 302c is coupled to the bus 101 of the computer system. Data encapsulated in packets is transferred between the network 310 and the processor 102 through the computer bus 101 and a NIC 302a. To encode signals suitably for transmission, the NIC 302a provides a transmitter/receiver function. Each type of NIC 302a, 302b, 302c has a corresponding driver program 304a, 304b, 304c. The driver programs 304a, 304b, 304c each are coupled to a driver support layer 306, which is a software element responsible for receiving data from a driver program, determining what protocol the data represents, and passing the data to a protocol stack 314.

The protocol stack 314 comprises a plurality of protocol layers 308a, 308b, 308c. Each of the protocol layers comprises a software element or routine that can receive data organized according to a particular protocol (such as the protocols shown in Table 2), interpret the data in a network data packet, convert it to another protocol, and pass it on to a superior or subordinate protocol. For example, in one embodiment, a protocol stack 314 comprises one layer 308a, etc. corresponding to each of layers 2 through 7 of the OSI reference model.

In the NT system, the driver support layer 306 corresponds to the data link layer (second layer) of the OSI reference model. The NT system can support several different kinds of driver support layer specifications, such as the Network Driver Interface Specification (NDIS) (developed by Microsoft Corporation and 3Com Corporation) and the Open Data link Interface (ODI) (developed by Apple Computer, Inc. and Novell Corporation). Also, ODI can be supported on top of NDIS.

The drivers 304a, 304b, 304c can be written to communicate with the driver support layer 306 rather than the protocol stack 314. In this way, those writing the drivers do not need to know the structure of the protocol stack 314, and each of the NICs 302a, 302b, 302c can support multiple protocols concurrently.

Multiple protocol stacks can be defined. The driver support layer 306 stores information describing each protocol stack 314 in the system. The driver support layer also stores information describing each driver 304a, 304b, 304c and the protocols it supports. When protocol stacks or drivers load, they identify themselves to the driver support layer. The driver support layer also stores meta-data describing data packets in event control blocks (ECBs) in the memory 104. ECBs contain packet identifiers used by the driver support layer to route packets.

Using this structure, when a data packet arrives from the network 310 at an NIC 302a, the NIC 302a encodes the data packet as a bit pattern and stores it in a small, on-board memory area or data buffer. Adapter logic communicates data from the data buffers to the computer bus 101 by translating the data using a media access method appropriate for the type of network connection in use (e.g., Ethernet, token ring, etc.). The NIC generates an interrupt request to inform the processor 102 that a data packet has arrived. The interrupt request is a signal on an interrupt line coupled from the NIC to an interrupt controller to the processor 102. In computers based on Intel processors, the interrupt line is an index to an interrupt vector table stored in local volatile memory. The interrupt vector table stores a pointer to an interrupt service routine or to one of the driver programs 304a, 304b, 304c used to handle the packet.

A driver such as driver program 304a then retrieves the data packet from the NIC buffer, writes a copy to main memory 104, formats the data in a way expected by driver support layer 306, and passes the packet to the driver support layer 306. The formatting performed by the driver program 304a includes identifying the transport layer to be used by the driver support layer 306. The driver support layer 306 determines which protocol is used for the data and passes the packet to a protocol layer 308a, 308b, 308c of the protocol stack 314. Each layer of the protocol stack reformats data in the packet so it can be used and understood by a higher layer. Higher-level processes such as the I/O Manager 218 and the Executive 206 remove packets from the protocol stack as they become available at the layer understood by such processes, and carry out substantive processing on the data. This process is known as passing a packet "up the stack."

To communicate a message from the processor 102 to the network 310 or Internet 312, the foregoing process is followed in reverse. This is known as passing a packet "down the stack." By passing packets down the stack, a command or character generated by an application program is quickly converted into a properly formatted bit pattern suitable for transmission over the network 310 according to one or more standard protocols. The stack allows use of many different combinations of protocols.

In one embodiment, the system further comprises a protocol proxy manager 350 coupled by a communication path 356 to the driver support layer 306. A protocol proxy stack 322, comprising a plurality of protocol proxy layers 320a, 320b, 320c, is coupled to the protocol proxy manager 350 along a bi-directional communication path. The protocol proxy manager 350 and the protocol proxy stack 322 are stored in a kernel memory area of main memory 104 and execute in Kernel Mode 204 of the operating system 200. The protocol proxy manager can communicate information up the protocol proxy stack 322 along communication path 352 and can receive packets coming down the protocol proxy stack along communication path 354.

An application layer proxy 340 located in an application layer 342 is coupled to the protocol proxy manager 350.

A security or session policy tree 330 in the kernel mode area of main memory 104 is coupled to the protocol proxy stack 322, to the application layer proxy 340, and to the protocol proxy manager 350.

Each of the protocol proxy layers 320a, 320b, 320c is a software element that is configured to operate in the same manner as a corresponding protocol layer 308a, 308b, 308c of protocol stack 314. Each of the protocol proxy layers 320a, 320b, 320c further comprises instructions that cause the processor 102 to carry out security check steps on each data packet that the protocol proxy layer receives. For example, in one embodiment, a protocol proxy layer 320a is responsible for the network layer and the currently defined network layer protocol is the Internet Protocol (IP). In this embodiment, the protocol proxy layer 320a may execute steps to check whether an IP address contained in a packet received at the protocol proxy layer 320a is a valid IP address and to drop or discard the packet if the address is invalid. This process is referred to as evaluation of a packet or conducting security checks on a packet. Each proxy layer performs security checks for all commands defined in the protocol associated with a proxy layer. The session policy tree has a node for each protocol that is valid for a particular session. Packets contain a session identifier. Security checks are performed only for protocols defined as part of a current session by the policy tree.

If the packet includes a request for application-layer services, such as HTTP object caching, the packet is passed to the application layer proxy 340. The application layer proxy 340 is stored in and executes in the application layer 342, i.e., outside the kernel mode and kernel memory space. The application layer proxy carries out the requested services on the data packet. By separating application layer evaluation, application layer services are carried out only when necessary, without slowing the security inspections by sending every data packet to the application layer. If the extra services are not needed, the packet never enters the application layer.

According to one embodiment, protocol proxy manager 350 poses as layer 308a (i.e. the transport layer) to all device drivers 304a, 304b and 304c, while simultaneously posing as a device driver to layer 308a. Specifically, when the protocol proxy manager 350 is installed, as part of an installation process the device drivers 304a, 304b, 304c are instructed that the protocol proxy manager 350 is the transport layer. In this way, when a packet is passed from a driver 304a to the driver support layer 306, the driver 304a will always request the driver support layer 306 to use the protocol proxy manager 350 as the transport layer. This ensures that all incoming data packets will be sent to the protocol proxy manager 350 rather than to the protocol stack 314.

Further, as part of the installation process, the NT system 200 is instructed that all devices attached to the system can only be accessed through the protocol proxy manager 350 posing as a device driver. In this way, all output messages from the system will be directed at the protocol proxy manager 350 rather than at an actual device driver 304a. Moreover, the protocol proxy manager 350 appears to the NT system as a device driver and therefore is simple to implement in the NT as it precludes the need to reconfigure proprietary network interface card driver programs.

The security checks and evaluation processes for each protocol layer are defined in the policy tree 330. The policy tree 330 is stored in the main memory 104 and is structured as a binary tree. In the binary tree, superior leaf nodes each represent a port number of a NIC and subordinate leaf nodes each represent a protocol recognized for that port number, or a test or condition to be applied to a packet originating from the NIC at that port number and for that protocol. A policy tree 330 is dynamically allocated in memory or created by the protocol proxy manager 350 whenever a new network session begins. The policy trees 330 define tests or conditions only for specific protocols that form a part of the session for which they are created. In this way, a system administrator can establish a secure system by excluding certain protocols from a given session.

The policy tree 330 is a representation of an abstract security policy. A security policy can instruct the system to accept or reject a data packet based upon criteria relating to the data packet. For example, the criteria include the current time of day, the current day of the week, the destination of the data packet such as a particular host or server, the identity of the network service represented by the packet (such as World Wide Web, FTP, etc.), and other criteria. An example of an abstract security policy that can be represented in the policy tree 330 is:

IF Time Of Day Is (0900 to 1700)
THEN If Service Is (FTP)
  THEN Reject
  OTHERWISE Accept
OTHERWISE If Service Is (HTTP)
  THEN Accept The policy tree 330 can be established and used as described in co-pending U.S. Provisional Patent Application Ser. No. 60/074,945, filed on Feb. 17, 1998, and non-provisional application Ser. No. 09/210,143, filed Dec. 11, 1998, entitled "Graphical Network Security Policy Management," the entire disclosure of which is hereby incorporated by reference as if fully set forth herein.

The protocol proxy manager 350 stores state information about each active session in the kernel memory in a set of state variables. Values in the state variables are passed to each of the protocol proxy layers as a packet moves up and down the layers.

More than one protocol proxy stack 322 may be stored in the kernel memory area. In one embodiment, protocol proxy stacks 322 are dynamically allocated and constructed whenever a new session begins. Each session has a separate protocol proxy stack. All the protocol proxy stacks are managed by the protocol proxy manager 350. When the session ends, the proxy stack for that session is deallocated and its memory space is reclaimed.

The protocol stack 314 of the NT system 200 coexists with the proxy protocol stacks allocated by protocol proxy manager 350 without any changes and can have a separate security policy assigned to it.

Figure 4A:
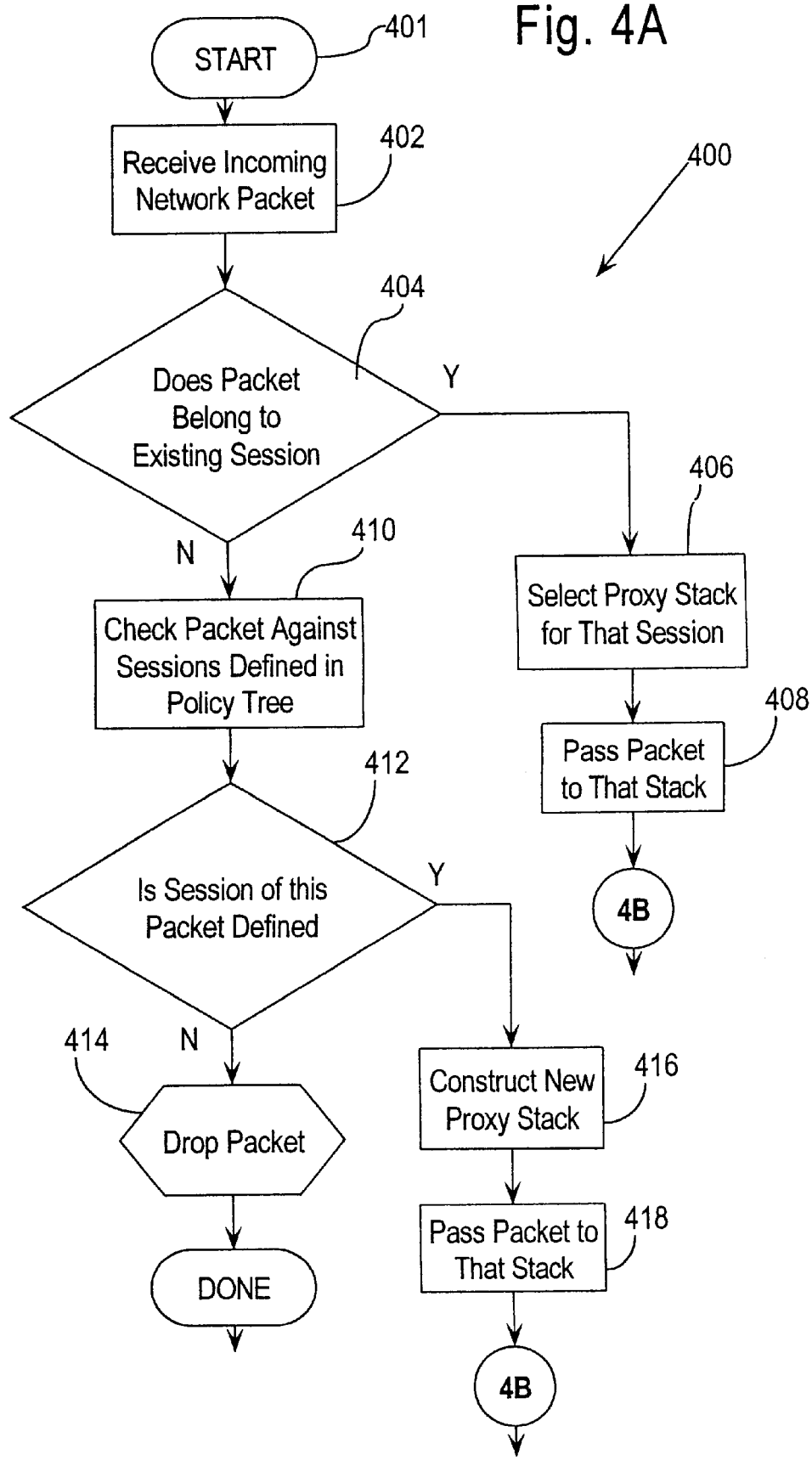

FIG. 4A is a flow diagram of a method (generally designated 400) of evaluating data in a computer. The start step 401 includes the substep of establishing, separately or offline, a session policy tree 330 that defines security policies. Based on a network security policy applied to each network interface card, the session policy tree is constructed and stored in memory to control the creation of sessions for that card. A system administrator defines the security policy. The start step 401 further includes the substep of establishing a protocol proxy stack comprising at least one protocol proxy layer in a kernel mode memory area of a computer system. The start step 401 may also include the substep of establishing a protocol proxy manager in communication with the protocol proxy stack and the computer system, and wherein the protocol proxy manager communicates with the security policy tree and with network interface cards of the computer system.

The process begins in step 402 wherein a computer system receives a data packet arriving from a computer network. As shown in step 404, each time a network packet arrives, the process tests whether the packet belongs to an existing session. This is done by calculating a session identifier from information contained within the packet and then comparing this identifier with a list of current sessions stored in a main memory of the computer system. If the packet belongs to a current session, then in step 406 the process selects the corresponding proxy stack from among the proxy stacks currently stored in the main memory. If proxy stacks have been created earlier for prior data packets, then the full set of such available proxy stacks will reside in a kernel memory area, ready to proxy any protocol layer and perform full security checks. In step 408 the process passes the packet to the protocol proxy stack for that session. Processing then continues with step 420, discussed below.

If the test of step 404 is negative, then the packet does not belong to an existing session. Therefore, in step 410 the packet is checked against the session policy tree definition to determine whether the session identified in the packet is a valid session for the network interface card from which the packet has been received. If the session policy tree contains definitions for the session and network interface card represented by the packet, as tested in step 412, then in step 416 a new proxy stack is dynamically constructed in memory. This protocol proxy stack is established in the kernel memory area. In step 418 the packet is passed to that proxy stack for evaluation. Processing then continues with step 420, discussed below.

If the test of step 412 is negative, then the session is not defined in the tree. Thus, the session identified in the packet is invalid or prohibited, and in step 414 the packet is dropped and the process is done. In this way, prohibited or invalid data packets are blocked by the system at an early stage.

For packets of a valid session, the dynamically constructed proxy stacks evaluate the network packet for only those protocols that are defined as valid by the session policy tree. As shown in step 420, from the session policy tree, the process retrieves the next protocol defined for the session of the current packet. If the protocol is associated with the next higher OSI layer, then the packet is passed to the next highest proxy layer and processing is carried out in that proxy layer. Through these steps, the packet moves up the protocol proxy stack. In steps 422 and 424 the process tests whether the format and contents of the packet are valid or allowed for the current protocol. If either one is invalid, then the packet is dropped and processing is complete. Steps 422 and 424 can include the substeps of analyzing all commands for each protocol, analyzing whether the routing specified in the packet is allowed, and other evaluations and tests. The specific evaluations and tests that are carried out vary according to the protocol. Protocols that can be evaluated include TCP, IP, UDP, and ICMP. For example, for the IP protocol, steps 422 and 424 may include the substeps of carrying out network address translation and determining whether the translated address is valid. For the TCP protocol, steps 422 and 424 may include the steps of verifying whether a checksum in the packet is valid for the contents of the packet.

If both the format and contents of the packet are valid, then in step 426 the process examines the packet to determine whether its format or contents need to be modified to comply with the current protocol. If so, then in step 428 the packet is modified to adjust its format and data to conform to the protocol.

In step 430 the process tests whether another protocol is defined for the current session. If so, then control returns to step 420 to repeat the foregoing process for the next protocol defined for the current session. In this way, a data packet is first tested at the lowest protocol layer defined for the session, and the data packet is allowed to proceed upward in the protocol proxy stack only after successfully passing lower level tests. Thus, each network packet and the data it carries must be valid for each protocol layer. This enables the system to trap faults at the earliest possible time before invalid or unauthorized packets rise to higher levels of the stack and before they are released to other processes or parts of the system.

If the process determines in step 430 that no other protocols are defined for the current session, then in step 432 the process examines the packet to determine whether it requires application-layer services. If so, then in step 434 the process passes the packet to an application layer protocol proxy running in application mode in an application memory area of the system, in which application layer services and further packet evaluation are carried out. Examples of application level tests include determining whether a request in the Hypertext Transfer Protocol (HTTP) is valid and whether such a request contains a valid Uniform Resource Locator (URL). In this way, for application-layer services, the application layer services are carried out only if necessary without slowing the security inspections.

After application-layer services are complete, or if none are needed, in step 444 the process passes the packet back down the stack by passing the packet sequentially back down proxy layers 320*d*, 320*e*, 320*f*. More or less than three such downward directed proxy layers 320*d*, 320*e*, 320*f* may be provided as long as there is one proxy layer for each proxy layer 320*a*, 320*b*, 320*c* through which packets are passed up the stack. At each of these downward directed proxy layers, the packet is re-examined and evaluated against protocols defined in the session policy tree for the session to which the packet belongs. In addition, the packet is formatted into according to a protocol understood by the next lower layer. Thus, the processing steps described above for proxy layers 320*a*, 320*b*, and 320*c* are essentially reversed as the packet passes down the stack through the layers 320*d*, 320*e*, 320*f*.

After the packet has been passed down the stack, in step 436 the process tests whether the network packet is destined for another computer. If so, then in step 442 the process passes the packet on to other system processes for delivery to that computer. In step 438 the system tests whether the destination of the network packet is the native network stack, and if so, it is passed on for delivery, as shown by step 440. In this way, only allowed packets are passed on to the native network protocol stacks, and each packet is examined at each layer of the operating system as the packet travels up and down the stack.

The system and processes disclosed herein can be implemented as one or more computer programs and can form a part of a "firewall" in a networked computer system. Indeed, the stack proxy architecture of the system enables it to be implemented in the same server computer that is used in a networked computer system to run other applications. For example, the system can be installed on a server computer that is running HTTP server software. The system and processes disclosed herein can be implemented as a sequence of machine instructions recorded on a computer readable medium such that the instructions, when executed by a computer, cause the computer to establish the structures and to carry out the processes described herein. Preferably, the system forms a part of a network gateway.

In one embodiment, in a networked computer system, a plurality of systems as described herein are deployed so that each server in the networked computer system has its own protocol proxy manager and protocol proxy stack. The session policy tree is stored in a centralized, high-speed database accessible over the network to each of the protocol proxy managers and protocol proxy stacks. A monitor program runs on one of the servers and polls each of the protocol proxy managers in the networked system to determine and report on the status of each of the managers. An administration program runs on one of the servers and provides a graphical user interface whereby the session policy tree can be created, configured, reviewed, modified, and stored in the database.

Thus, a method, apparatus, and product for evaluating data in a computer has been described. A protocol proxy stack is established in the kernel memory area. The full set of available proxies reside in the kernel, ready to proxy any protocol layer and perform full security checks. Based on the network security policy applied to each network adapter card, a session policy tree is constructed and stored in memory to control the creation of sessions for that card. Each time a network packet arrives, it is examined to determine whether it belongs to an existing session. If so, the packet is passed to the protocol proxy stack for that session. Otherwise, the packet is checked against the session policy tree definition. If the session policy tree contains definitions for the session represented by the packet, a new proxy stack is dynamically constructed and the packet is passed to that stack for evaluation. If the session is not defined in the tree, the packet is dropped.

Dynamically constructed stacks evaluate the network packet for only those protocols that are defined by the session. All commands for each protocol are analyzed. The packet can be modified by any layer in the stack or dropped if the security checks fail. All packet modifications are performed at the appropriate protocol proxy layer. If the network packet is destined for another computer or the native network stack, it is passed on for delivery. For application-layer services, the protocol proxy manager forwards the packet to an application layer proxy that provides extra services without slowing the security inspections.

Because packet evaluation occurs in kernel mode and in kernel memory, rather than after packets arrive at the application layer, performance of the system is higher than known packet filtering systems. In addition, since the native NT protocol stack is not affected, local programs can run using the native NT protocol stack, circumventing all the security checks. This prevents such local programs from suffering performance degradation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for evaluating a data packet using a network operating system, comprising:

a protocol layer proxy stored in a kernel memory and executed in a kernel mode of said network operating system; and a sequence of instructions stored in said kernel memory and executed in the kernel mode configured to cause a processor under control of said network operating system to execute the steps of:

evaluating said data packet in said protocol layer proxy in the kernel mode to determine whether said data packet satisfies a predetermined condition; and passing said data packet from said protocol layer proxy to a protocol stack that is outside the kernel mode of said network operating system only if said data packet satisfies said predetermined condition.

2. The system recited in claim 1, further comprising an initial security policy defining said condition of said data packet to be evaluated and coupled to said protocol layer proxy.

3. The system recited in claim 2, further comprising:

a second security policy defining a second condition of an application protocol of said data packet to be evaluated; and wherein said sequence of instructions further comprises instructions configured to cause said processor to execute the step of passing said data packet to said network operating system only if said data packet complies with said second security policy.

4. The system of claim 1, further comprising a second protocol layer proxy for evaluating different data of a second protocol different from a first protocol evaluated by said protocol layer proxy at the same time as said protocol layer proxy, and wherein said protocol layer proxy and said second protocol layer proxy are contained in a protocol proxy stack coupled to said network operating system.

5. The system of claim 1, wherein said protocol layer proxy is configured to evaluate a UDP protocol element of the data packet.

6. The system of claim 1, wherein the protocol layer proxy is configured to evaluate an Internet Control Messaging Protocol (ICMP) protocol element of the data packet.

7. A system for evaluating a data packet using a network operating system, comprising:

a protocol layer proxy in a kernel memory of said network operating system; and a sequence of instructions stored in said kernel memory configured to cause a processor under control of said network operating system to execute the steps of:

evaluating said data packet in said protocol layer proxy to determine whether said data packet satisfies a predetermined condition;

passing said data packet from said protocol layer proxy to said network operating system only if said data packet satisfies said predetermined condition;

an initial security policy defining said condition of said data packet to be evaluated and coupled to said protocol layer proxy;

a security policy decision tree in said kernel memory structured as a binary tree and comprising as nodes thereof said security policy and at least a second security policy.

8. The system recited in claim 7, further comprising at least one existing session identifier stored in said kernel memory; and wherein said sequence of instructions further comprises instructions configured to cause said processor to execute the step of:

passing said data packet to said protocol layer proxy only if said data packet matches an existing session identifier.

9. A system for evaluating a data packet using a network operating system comprising:

a protocol layer proxy in a kernel memory of said network operating system; and a sequence of instructions stored in said kernel memory configured to cause a processor under control of said network operating system to execute the steps of:

evaluating said data packet in said protocol layer proxy to determine whether said data packet satisfies a predetermined condition;

passing said data packet from said protocol layer proxy to said network operating system only if said data packet satisfies said predetermined condition;

an initial security policy defining said condition of said data packet to be evaluated and coupled to said protocol layer proxy;

a network adapter card coupled to said processor; and a security policy decision tree in said kernel memory organized as a binary tree and comprising said security policy and a second security policy associated with said network adapter card.

10. The system recited in claim 9, wherein said security policy decision tree comprises a session identifier associated with a network adapter card identifier and with an allowed protocol for said session identifier and said network adapter card; and wherein said sequence of instructions further comprises instructions configured to cause said processor to execute the step of passing said data packet to said protocol layer proxy only if said data packet matches said session identifier.

11. The system of claim 10, wherein said sequence of instructions further comprises instructions configured to cause said processor to execute the step of passing said data packet to said protocol layer proxy only if said data packet matches said allowed protocol.

12. The system of claim 11, further comprising:
a state variable stored in said protocol layer proxy describing a current state of a current network session.

13. The system of claim 10, further comprising:
a second protocol layer proxy associated with said session identifier; and
wherein said sequence of instructions further comprises instructions configured to cause said processor to execute the step of passing said data packet to said second protocol layer proxy for evaluation therein.

14. The system of claim 9 wherein said protocol layer proxy is coupled to a protocol stack of said network operating system and wherein one of said security policies defines an acceptable criteria for data packets directed to said protocol stack.

15. A system for evaluating a data packet using a network operating system, comprising:
a protocol layer proxy in a kernel memory of said network operating system, and
a sequence of instructions stored in said kernel memory configured to cause a processor under control of said network operating system to execute the steps of:
evaluating said data packet in said protocol layer proxy to determine whether said data packet satisfies a predetermined condition;
passing said data packet from said protocol layer proxy to said network operating system only if said data packet satisfies said predetermined condition;
wherein said sequence of instructions further comprises instructions configured to cause said processor to execute the step of identifying said protocol layer proxy as a device driver to said network operating system.

16. A system for evaluating a data packet using a network operating system, comprising:
a protocol layer proxy in a kernel memory of said network operating system; and
a sequence of instructions stored in said kernel memory configured to cause a processor under control of said network operating system to execute the steps of:
evaluating said data packet in said protocol layer proxy to determine whether said data packet satisfies a predetermined condition;
passing said data packet from said protocol layer proxy to said network operating system only if said data packet satisfies said predetermined condition;
wherein said sequence of instructions further comprises instructions configured to cause said processor to execute the step of instructing said network operating system that said protocol layer proxy is a network device.

17. A system for evaluating a data packet using a network operating system, comprising:
a protocol layer proxy in a kernel memory of said network operating system; and
a sequence of instructions stored in said kernel memory configured to cause a processor under control of said network operating system to execute the steps of:
evaluating said data packet in said protocol layer proxy to determine whether said data packet satisfies a predetermined condition;
passing said data packet from said protocol layer proxy to said network operating system only if said data packet satisfies said predetermined condition;
wherein said sequence of instructions further comprises instructions configured to cause said processor to execute the step of instructing a device driver coupled to said network operating system that said protocol layer proxy is a transport layer for said device driver.

18. A system for evaluating data that arrives at a computer system that is executing a network operating system, comprising:
a protocol stack proxy stored in a kernel memory and executed in a kernel mode of the network operating system and coupled between (a) a device driver on said computer system that is configured to receive said data from a network and deliver said data according to a first protocol associated with a first network layer and (b) a component of said network operating system that receives packets according to said first protocol;
said protocol stack proxy including a proxy layer configured to
(i) receive said data from said device driver;
(ii) pass said data to a second network layer that is higher than said first network layer; and
(iii) evaluate said data to determine whether said data satisfies a predetermined criteria, and if so, pass said data to a protocol stack of the network operating system that is executed outside the kernel mode.

19. The system recited in claim 18, wherein said proxy layer is configured to test whether said data satisfies said predetermined criteria, and if so, then to pass said data to said first network layer and transmit said data to said component of said network operating system.

20. A system for evaluating data that arrives at a computer system that is executing a network operating system, comprising:
a protocol stack proxy coupled between (a) a device driver on said computer system that is configured to receive said data from a network and deliver said data according to a first protocol associated with a first network layer and (b) a component of said network operating system that receives packets according to said first protocol;
said protocol stack proxy including a proxy layer configured to
(i) receive said data from said device driver;
(ii) pass said data to a second network layer that is higher than said first network layer; and
(iii) evaluate said data to determine whether said data satisfies a predetermined criteria;
an application layer proxy in an application memory of said computer system;
a first security policy coupled to said protocol stack proxy and defining said criteria;
a second security policy defining a second condition of an application protocol of said data to be evaluated; and
wherein said protocol stack proxy is configured to pass said data to said application layer proxy only if said data complies with said second security policy.

21. A system for evaluating data that arrives at a computer system that is executing a network operating system, comprising:
a protocol stack proxy coupled between (a) a device driver on said computer system that is configured to receive said data from a network and deliver said data according to a first protocol associated with a first network layer and (b) a component of said network operating system that receives packets according to said first protocol;

said protocol stack proxy including a proxy layer configured to
- (i) receive said data from said device driver;
- (ii) pass said data to a second network layer that is higher than said first network layer; and
- (iii) evaluate said data to determine whether said data satisfies a predetermined criteria;

a security policy decision tree in a kernel memory of said computer system and structured as a binary tree and comprising as nodes thereof said security policy and at least a second security policy.

22. The system recited in claim 21, further comprising at least one existing session identifier stored in said kernel memory; and wherein said protocol stack proxy is configured to pass said data to said proxy layer only if said data matches an existing session identifier.

23. The system recited in claim 21, further comprising
a network adapter card in said computer system and coupled to said protocol stack proxy; and
wherein the security policy decision tree comprises a first security policy and a second security policy associated with said network adapter card.

24. The system recited in claim 23, wherein said security policy decision tree comprises a session identifier associated with a network adapter card identifier and with an allowed protocol for said session identifier and said network adapter card; and
wherein said protocol stack proxy is configured to cause said protocol stack proxy to pass said data to said proxy layer only if said data matches said session identifier.

25. The system of claim 24, wherein said protocol stack proxy is configured to pass said data to said protocol layer proxy only if said data matches said allowed protocol.

26. The system of claim 25, further comprising:
a second proxy layer associated with said session identifier; and
wherein protocol stack proxy is configured to cause said processor to pass said data to said second proxy layer for evaluation therein.

27. The system of claim 26, further comprising:
a state variable stored in said protocol layer proxy and describing a current state of a current network session.

28. A system for evaluating data that arrives at a computer system that is executing a network operating system comprising:
a protocol stack proxy coupled between (a) a device driver on said computer system that is configured to receive said data from a network and deliver said data according to a first protocol associated with a first network layer and (b) a component of said network operating system that receives packets according to said first protocol;
said protocol stack proxy including a proxy layer configured to
- (i) receive said data from said device driver;
- (ii) pass said data to a second network layer that is higher than said first network layer; and
- (iii) evaluate said data to determine whether said data satisfies a predetermined criteria;
wherein said protocol stack proxy is configured to identify said proxy layer as said device driver to said network operating system.

29. A method for evaluating data that arrives at a computer system that is executing a network operating system, comprising the steps of:
establishing in a kernel memory of said computer system a protocol stack proxy that is executed in kernel mode of the network operating system and that is coupled between (a) a device driver on said computer system that is configured to receive said data from a network and deliver said data according to a first protocol associated with a first network layer and (b) a component of said network operating system that receives packets according to said first protocol;
with a proxy layer in said protocol stack proxy, receiving said data from said device driver;
passing said data to a second network layer that is higher than said first network layer;
determining whether said data satisfies a predetermined criteria;
passing said data to a protocol stack of the network operating system that is executed outside the kernel mode when the data satisfies the predetermined criteria.

30. The method recited in claim 29, wherein said computer system comprises a plurality of device drivers and said protocol stack proxy comprises a plurality of proxy layers, each proxy layer associated with one of said device drivers, and wherein the method further comprises the steps of, in each of said proxy layers:
receiving said data from each of said device drivers;
passing said data to said second network layer; and
evaluating said data to determine whether said data satisfies said predetermined criteria.

31. The method recited in claim 29, wherein said computer system further comprises a security policy in said memory and coupled to said protocol stack proxy and defining said criteria.

32. A method for evaluating data that arrives at a computer system that is executing a network operating system, comprising the steps of:
establishing in a memory of said computer system a protocol stack proxy coupled between (a) a device driver on said computer system that is configured to receive said data from a network and deliver said data according to a first protocol associated with a first network layer and (b) a component of said network operating system that receives packets according to said first protocol;
with a proxy layer in said protocol stack proxy, receiving said data from said device driver;
passing said data to a second network layer that is higher than said first network layer;
evaluating said data to determine whether said data satisfies a predetermined criteria;
wherein said computer system further comprises a security policy in said memory and coupled to said protocol stack proxy and defining said criteria;
establishing an application layer proxy in an application memory of said computer system coupled to said protocol stack proxy;
establishing a second security policy in said memory defining a second condition of an application protocol of said data to be evaluated; and
passing said data to said application layer proxy only if said data complies with said second security policy.

33. A method for evaluating data that arrives at a computer system that is executing a network operating system, comprising the steps of:
establishing in a memory of said computer system a protocol stack proxy coupled between (a) a device driver on said computer system that is configured to receive said data from a network and deliver said data according to a first protocol associated with a first network layer and (b) a component of said network operating system that receives packets according to said first protocol;

with a proxy layer in said protocol stack proxy, receiving said data from said device driver;

passing said data to a second network layer that is higher than said first network layer;

evaluating said data to determine whether said data satisfies a predetermined criteria;

wherein said computer system further comprises a security policy in said memory and coupled to said protocol stack proxy and defining said criteria;

establishing a security policy decision tree in a kernel memory of said computer system structured as a binary tree and comprising as nodes thereof said security policy and at least a second security policy.

34. The method recited in claim 33, further comprising the steps of:

establishing at least one existing session identifier stored in said kernel memory; and passing said data to said proxy layer only if said data matches an existing session identifier.

35. The method recited in claim 33, wherein said computer system further comprises a network adapter card in said computer system and coupled to said protocol stack proxy; and wherein said method further comprises the step of:

establishing the security policy decision tree comprising a first security policy and a second security policy associated with said network adapter card.

36. The method recited in claim 35, wherein the step of establishing said security policy decision tree includes the steps of:

establishing in said security policy decision tree a session identifier associated with a network adapter card identifier and with an allowed protocol for said session identifier and said network adapter card; and passing said data to said proxy layer only if said data matches said session identifier.

37. The method of claim 36, wherein said protocol stack proxy is configured to pass said data to said proxy layer only if said data matches said allowed protocol.

38. The method of claim 37, further comprising the steps of:

establishing in said memory a second proxy layer associated with said session identifier; and evaluating said data in said second proxy layer to determine whether said data conforms to a second protocol associated with said second proxy layer.

39. The method of claim 38, further comprising the step of establishing a state variable stored in said proxy layer and describing a current state of a current network session.

40. A method for evaluating data that arrives at a computer system that is executing a network operating system, comprising the steps of:

establishing in a memory of said computer system a protocol stack proxy coupled between (a) a device driver on said computer system that is configured to receive said data from a network and deliver said data according to a first protocol associated with a first network layer and (b) a component of said network operating system that receives packets according to said first protocol;

with a proxy layer in said protocol stack proxy receiving said data from said device driver;

passing said data to a second network layer that is higher than said first network layer;

evaluating said data to determine whether said data satisfies a predetermined criteria;

further comprising the step of communicating from said protocol stack proxy to said network operating system an identification that said proxy layer is said device driver.

41. A system for evaluating data that arrives at a computer system that is executing a network operating system, comprising:

a protocol stack proxy coupled between a device driver on the computer system that is executed in kernel mode of the network operating system and configured to receive the data from a network and deliver the data according to a first protocol associated with a first network layer; and one or more components of the network operating system that receive packets according to the first protocol;

the protocol stack proxy including one or more protocol proxy layers, each proxy layer associated with one of the network layers, configured to: (A) receive the data from the device driver; (B) pass the data to a proxy layer associated with a second network layer that is higher than the first network layer; (C) evaluate the data to determine whether the data satisfies a predetermined criteria; and (D) if the data satisfies the predetermined criteria, to (D1) pass the data to the proxy layer associated with the first network layer, and (D2) transmit the data to the one or more components to the network operating system.

42. A system for evaluating a data packet using a network operating system, comprising:

an application layer proxy in an application memory of said network operating system;

a protocol layer proxy stored in a kernel memory and executed in a kernel mode of said network operating system, and coupled to the application layer proxy; and a sequence of instructions stored in said kernel memory and executed in the kernel mode configured to cause a processor under control of said network operating system to execute the steps of:

evaluating said data packet in said protocol layer proxy in the kernel mode to determine whether said data packet satisfies a predetermined condition;

passing said data packet from said protocol layer proxy to a protocol stack that is outside the kernel mode of said network operating system only if said data packet satisfies said predetermined condition;

passing the data packet to the application layer proxy when information in the data packet includes a request for an application layer service.

43. A computer-readable medium carrying one or more sequences of instructions for evaluating data that arrives at a computer system that is executing a network operating system, wherein execution of the one or more sequences of instructions by one or more processors causes the one or more processors to perform the steps of:

establishing in a kernel memory of said computer system a protocol stack proxy that is executed in kernel mode of the network operating system and that is coupled between (a) a device driver on said computer system that is configured to receive said data from a network and deliver said data according to a first protocol associated with a first network layer and (b) a component of said network operating system that receives packets according to said first protocol;

with a proxy layer in said protocol stack proxy, receiving said data from said device driver;

passing said data to a second network layer that is higher than said first network layer;

determining whether said data satisfies a predetermined criteria;

passing said data to a protocol stack of the network operating system that is executed outside the kernel mode when the data satisfies the predetermined criteria.

44. A computer-readable medium as recited in claim 43, wherein the step of establishing in a kernel memory of said computer system a protocol stack proxy includes the steps of establishing in a kernel memory of said computer system a protocol stack proxy that comprises a plurality of device drivers and a plurality of proxy layers, each proxy layer associated with one of said device drivers, and wherein execution of the one or more sequences of instructions by one or more processors causes the one or more processors to perform the further steps of, in each of said proxy layers:

receiving said data from each of said device drivers;

passing said data to said second network layer; and evaluating said data to determine whether said data satisfies said predetermined criteria.

45. The computer-readable medium as recited in claim 43, wherein execution of the one or more sequences of instructions by one or more processors causes the one or more processors to perform the further steps of:

establishing an application layer proxy in an application memory of said computer system coupled to said protocol stack proxy;

establishing a second security policy in said memory defining a second condition of an application protocol of said data to be evaluated; and passing said data to said application layer proxy only if said data complies with said second security policy.

46. The computer-readable medium as recited in claim 43, wherein execution of the one or more sequences of instructions by one or more processors causes the one or more processors to perform the further steps of:

establishing a security policy decision tree in a kernel memory of said computer system structured as a binary tree and comprising as nodes thereof said security policy and at least a second security policy.

47. The computer-readable medium as recited in claim 46, wherein execution of the one or more sequences of instructions by one or more processors causes the one or more processors to perform the further steps of:

establishing in said security policy decision tree a session identifier associated with a network adapter card identifier and with an allowed protocol for said session identifier and said network adapter card; and passing said data to said proxy layer only if said data matches said session identifier.

48. The computer-readable medium as recited in claim 43, wherein execution of the one or more sequences of instructions by one or more processors causes the one or more processors to perform the further steps of:

establishing at least one existing session identifier stored in said kernel memory; and passing said data to said proxy layer only if said data matches an existing session identifier.

49. The computer-readable medium as recited in claim 43, wherein execution of the one or more sequences of instructions by one or more processors causes the one or more processors to perform the further steps of:

establishing the security policy decision tree in a kernel memory of said computer system organized as a binary tree and comprising a first security policy and a second security policy associated with a network adapter card in said computer system and coupled to said protocol stack proxy.

50. The computer-readable medium as recited in claim 43, wherein execution of the one or more sequences of instructions by one or more processors causes the one or more processors to perform the further steps of:

communicating from said protocol stack proxy to said network operating system an identification that said proxy layer is said device driver.

* * * * *